(12) United States Patent
Li et al.

(10) Patent No.: US 12,143,700 B2
(45) Date of Patent: Nov. 12, 2024

(54) CAMERA MOTOR, CAMERA MODULE, AND ELECTRONIC DEVICE

(71) Applicant: Huawei Technologies Co., Ltd., Shenzhen (CN)

(72) Inventors: Zhangcheng Li, Shanghai (CN); Jing Chu, Shenzhen (CN); Lei Jiang, Tampere (FI); Zhezhu Huang, Shenzhen (CN); Yingfei Shu, Shanghai (CN); Yingyong He, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 176 days.

(21) Appl. No.: 17/782,038

(22) PCT Filed: Oct. 28, 2020

(86) PCT No.: PCT/CN2020/124443
§ 371 (c)(1),
(2) Date: Jun. 2, 2022

(87) PCT Pub. No.: WO2021/109757
PCT Pub. Date: Jun. 10, 2021

(65) Prior Publication Data
US 2023/0007153 A1    Jan. 5, 2023

(30) Foreign Application Priority Data

Dec. 6, 2019 (CN) .......................... 201911245274.6

(51) Int. Cl.
*H04N 23/52* (2023.01)
*H04N 23/55* (2023.01)
*H04N 23/57* (2023.01)

(52) U.S. Cl.
CPC ............. *H04N 23/52* (2023.01); *H04N 23/55* (2023.01); *H04N 23/57* (2023.01)

(58) Field of Classification Search
CPC ........ H04N 23/52; H04N 23/55; H04N 23/57; H04N 23/50; G03B 2205/0015;
(Continued)

(56) References Cited

U.S. PATENT DOCUMENTS

| 2008/0192124 A1* | 8/2008 | Nagasaki ................. G02B 7/08 |
| | | 348/E5.04 |
| 2011/0026915 A1 | 2/2011 | Baik et al. |

(Continued)

FOREIGN PATENT DOCUMENTS

| CN | 202196247 U | 4/2012 |
| CN | 104808416 A | 7/2015 |

(Continued)

*Primary Examiner* — Joel W Fosselman
(74) *Attorney, Agent, or Firm* — Conley Rose, P.C.

(57) ABSTRACT

A camera motor includes a motor housing, a lens bearing apparatus, a cushioning part, and a drive apparatus. The motor housing has an accommodating cavity, and the lens bearing apparatus is accommodated in the accommodating cavity and is spaced apart from an inner wall of the accommodating cavity. The cushioning part is disposed on an outer surface of the lens bearing apparatus. The drive apparatus is accommodated in the accommodating cavity, and the drive apparatus can drive the lens bearing apparatus to move in the accommodating cavity.

20 Claims, 8 Drawing Sheets

(58) Field of Classification Search
CPC . G03B 3/10; G03B 5/02; G03B 30/00; G03B 2205/0069; G02B 27/646; G02B 7/08
See application file for complete search history.

(56) References Cited

U.S. PATENT DOCUMENTS

| | | | |
|---|---|---|---|
| 2013/0107068 A1 | 5/2013 | Kim et al. | |
| 2015/0212336 A1* | 7/2015 | Hubert | H04N 23/55 359/554 |
| 2015/0222793 A1* | 8/2015 | Kang | H04N 23/55 348/373 |
| 2016/0274328 A1* | 9/2016 | Shin | H04N 23/51 |
| 2016/0313568 A1* | 10/2016 | Ichihashi | G02B 27/646 |
| 2016/0323487 A1 | 11/2016 | Lee | |
| 2017/0003575 A1 | 1/2017 | Rammah et al. | |
| 2017/0052342 A1* | 2/2017 | Shin | G03B 3/10 |
| 2018/0149142 A1* | 5/2018 | Bunting | F03G 7/0614 |
| 2018/0246342 A1* | 8/2018 | Miller | H04N 23/67 |
| 2020/0310151 A1* | 10/2020 | Sue | H04N 23/687 |
| 2020/0344417 A1* | 10/2020 | Xu | G03B 3/10 |

FOREIGN PATENT DOCUMENTS

| | | |
|---|---|---|
| CN | 205901901 U | 1/2017 |
| CN | 206411316 U | 8/2017 |
| CN | 107846486 A | 3/2018 |
| CN | 108174104 A | 6/2018 |
| CN | 105657258 B | 1/2019 |
| CN | 109413316 A | 3/2019 |
| CN | 109856891 A | 6/2019 |
| CN | 209001794 U | 6/2019 |
| CN | 209375796 U | 9/2019 |
| JP | 2006313272 A | 11/2006 |
| JP | 2018169447 A | 11/2018 |

* cited by examiner

A-A

C-C

CAMERA MOTOR, CAMERA MODULE, AND ELECTRONIC DEVICE

CROSS-REFERENCE TO RELATED APPLICATIONS

This is a U.S. National Stage of International Patent Application No. PCT/CN2020/124443 filed on Oct. 28, 2020, which claims priority to Chinese Patent Application Ser. No. 201911245274.6 filed on Dec. 6, 2019. Both of the aforementioned applications are hereby incorporated by reference in their entireties.

TECHNICAL FIELD

This application relates to the field of terminal devices, and in particular, to a camera motor, a camera module, and an electronic device.

BACKGROUND

As customers have increasingly high photographing requirements on mobile phones, a large aperture lens has been favored by users. The large aperture lens is borne by a lens bearing apparatus. However, the large aperture lens is relatively heavy. Therefore, internal impact stress of the lens bearing apparatus increases when the lens bearing apparatus moves or is forced to shake. Consequently, the lens bearing apparatus and the lens are prone to damage, and imaging is affected.

SUMMARY

This application provides a camera motor, a camera module, and an electronic device, to reduce impact on a lens bearing apparatus and a lens, reduce a risk of damage to the lens bearing apparatus and the lens, and ensure imaging quality.

According to a first aspect, this application provides a camera motor, and the camera motor is configured to drive a lens. The camera motor includes a motor housing, a lens bearing apparatus, a cushioning part, and a drive apparatus. The motor housing has an accommodating cavity. The lens bearing apparatus is accommodated in the accommodating cavity, and is spaced apart from an inner wall of the accommodating cavity. The cushioning part is disposed on an outer surface of the lens bearing apparatus. The lens bearing apparatus is configured to bear the lens, and can drive the lens to move in an optical axis direction of the lens relative to the outer surface of the lens bearing apparatus. The drive apparatus is accommodated in the accommodating cavity, and the drive apparatus can drive the lens bearing apparatus to move in the accommodating cavity.

The lens bearing apparatus may include a bearer housing, a focusing apparatus, and a lens barrel. Both the focusing apparatus and the lens barrel are installed in the bearer housing. The lens is fastened in the lens barrel, and the focusing apparatus is configured to drive the lens barrel to move in the optical axis direction of the lens relative to the bearer housing, so that the lens barrel drives the lens to move relative to the bearer housing, thereby implementing focusing. In other words, when the lens bearer apparatus drives the lens to perform focusing, the lens can be enabled to move relative to the hearer housing, and the lens does not move together with the lens bearing apparatus.

Any outer surface of the lens bearing apparatus may be spaced apart from the inner wall of the accommodating cavity. The drive apparatus is configured to drive the lens bearing apparatus to move on a plane perpendicular to the optical axis direction (the plane may be referred to as a circumferential plane), or may drive the lens bearing apparatus to tilt relative to the circumferential plane even if the lens performs tilting movement relative to the optical axis direction of the lens, to implement optical image stabilization.

The cushioning part may be disposed on any outer surface of the lens bearing apparatus, and the cushioning part may be made of a material that can cushion vibration absorption. When the lens bearing apparatus collides with the inner wall of the accommodating cavity, the cushioning part can reduce impact stress on the lens bearing apparatus and the lens, to protect the lens bearing apparatus and the lens.

In an implementation, the cushioning part includes a first cushioning part, and the first cushioning part can move in the accommodating cavity along with the lens bearing apparatus, and is in contact with or is separated from the inner wall of the accommodating cavity. When the lens bearing apparatus collides with the inner wall of the accommodating cavity, the first cushioning part comes into contact with the inner wall of the accommodating cavity, and when the lens bearing apparatus moves in an inverse direction, the first cushioning part is separated from the inner wall of the accommodating cavity. The first cushioning part may be made of a single material or a mixed material of several materials. The first cushioning part can cushion impact and reduce impact stress on the lens bearing apparatus and the lens, to protect the lens bearing apparatus and the lens and limit the lens bearing apparatus.

In an implementation, the cushioning part includes a second cushioning part, the second cushioning part connects the outer surface of the lens bearing apparatus and the inner wall of the accommodating cavity, and the second cushioning part can be deformed when the lens bearing apparatus moves in the accommodating cavity. The second cushioning part is always connected to the outer surface of the lens bearing apparatus and the inner wall of the accommodating cavity. The second cushioning part may be made of a material that has cushioning performance and damping performance and that can be elastically detbrmed. Due to the damping performance, the second cushioning part can suppress vibration of the lens bearing apparatus, to reduce or eliminate abnormal sound of the camera motor. In addition, the second cushioning part is soil in texture, and may be deformed when the lens bearing apparatus moves. Therefore, movement of the lens bearing apparatus is not hindered. The second cushioning part can play a role of absorbing impact and reducing impact stress.

In an implementation, the lens bearing apparatus has a mounting through hole, and the mounting through hole is used to mount the lens. The outer surface of the lens bearing apparatus includes a peripheral side surface, and the peripheral side surface surrounds an axis of the mounting through hole. The peripheral side surface is spaced apart from the inner wall of the accommodating cavity, and the cushioning part is disposed on the peripheral side surface. The axis of the mounting through hole may be parallel to or approximately parallel to the optical axis direction of the lens. When the cushioning part is disposed on the peripheral side surface, impact stress on the lens bearing apparatus and the lens can be greatly reduced tbr a scenario in which the lens bearing apparatus moves on the circumferential plane.

In an implementation, the outer surface of the lens bearing apparatus includes an axial plane, the peripheral side surface is connected to a periphery of the axial pian, the axial plane is perpendicular to the axis of the mounting through hole, the axial plane is spaced apart from the inner wall of the accommodating cavity, and the cushioning part is disposed on the axial plane. When the cushioning part is disposed on the axial plane, impact stress on the lens bearing apparatus and the lens can be greatly reduced for a scenario in which the lens bearing apparatus moves in the optical axis direction.

In an implementation, the drive apparatus can drive the lens bearing apparatus to move on a plane perpendicular to the axis of the mounting through hole. The axis of the mounting through hole may be parallel to an optical axis of the lens. Therefore, the drive apparatus can drive the lens bearing apparatus to move on the circumferential plane, to implement optical image stabilization.

In an implementation, the drive apparatus includes a spring plate, a power supply part, and a shape memory alloy wire. The spring plate is located between the lens bearing apparatus and the power supply part, the spring plate includes a body part and an elastic arm that are connected, the body part is fastened to the lens bearing apparatus, and the elastic arm is fastened to the power supply part. The power supply part is fastened in the accommodating cavity, and the power supply part is configured to supply power to the shape memory alloy wire. One end of the shape memory alloy wire is fastened to the power supply part, and the other end of the shape memory alloy wire is fastened to the body part. The shape memory alloy wire can be deformed when being powered on, to drive the body part and the lens bearing apparatus to move. The drive apparatus can drive, by using a feature of the shape memory alloy wire, the lens bearing apparatus to move on the circumferential plane, to implement optical image stabilization. The elastic arm of the spring plate can provide elastic force, and the elastic force can enable the lens bearing apparatus to move stably and pull the lens bearing apparatus back to a specified position when power is off. When the cushioning part is disposed in the camera motor that uses the drive apparatus, impact stress on the lens bearing apparatus and the lens can be greatly reduced.

In an implementation, the lens bearing apparatus includes a permanent magnet disposed inside the lens bearing apparatus, the drive apparatus includes a power supply part and a coil (which may be referred to as an image stabilization coil), both the coil and the power supply part are spaced apart from the lens bearing apparatus, both the coil and the power supply part are fastened in the accommodating cavity, the coil is fastened to the power supply part, and the coil can apply driving force to the permanent magnet when being powered on, to drive the lens bearing apparatus to move. The coil of the drive apparatus can interact with the permanent magnet in the lens bearing apparatus, to drive the lens bearing apparatus to move on the circumferential plane, thereby implementing optical image stabilization. When the cushioning part is disposed in the camera motor that uses the drive apparatus, impact stress on the lens bearing apparatus and the lens can be greatly reduced.

In an implementation, the drive apparatus includes an elastic column, one end of the elastic column is fastened to the power supply part, and the other end of the elastic column is fastened to the lens bearing apparatus. When the lens bearing apparatus moves, the elastic column can be elastically bent when being pulled by the lens bearing apparatus. By using the elastic column, the lens bearing apparatus may hang on the power supply part. The elastic column may further play a role of conducting electricity, to electrically connect the power supply part to a focusing coil in the lens bearing apparatus. When the lens bearing apparatus moves, the elastic column is bent when being pulled by the lens bearing apparatus. The lens bearing apparatus can stably move to a required position under the joint action of the image stabilization coil, the permanent magnet, and the elastic column. When power is off, the elastic column can be restored from deformation, to pull the lens bearing apparatus back to the specified position.

According to a second aspect, this application provides a camera motor, and the camera motor is configured to drive a lens. The camera motor includes a motor housing, a lens bearing apparatus, a cushioning part, and a drive apparatus. The motor housing has an accommodating cavity, the lens bearing apparatus is accommodated in the accommodating cavity and is spaced apart from an inner wall of the accommodating cavity, and the lens bearing apparatus is configured to fasten the lens, so that the lens and the lens bearing apparatus are relatively still. The cushioning part is disposed on an outer surface of the lens bearing apparatus. The drive apparatus is configured to drive the lens bearing apparatus to move in an optical axis direction of the lens and move on a plane perpendicular to the optical axis direction.

In this application, the lens bearing apparatus does not drive the lens to perform focusing movement, the lens bearing apparatus is only used to fasten the lens, so that there is no relative movement between the lens bearing apparatus and the lens. The drive apparatus can drive the lens bearing apparatus to move in the optical axis direction to implement focusing. The drive apparatus can further drive the lens bearing apparatus to move on a circumferential plane to implement optical image stabilization. The drive apparatus may also drive the lens bearing apparatus to tilt relative to the circumferential plane to implement optical image stabilization. The cushioning part may be disposed on any outer surface of the lens bearing apparatus, and the cushioning part may be made of a material that can cushion vibration absorption. When the lens bearing apparatus collides with the inner wall of the accommodating cavity, the cushioning part can reduce impact stress on the lens bearing apparatus and the lens, to protect the lens bearing apparatus and the lens.

In an implementation, the cushioning part includes a first cushioning part, and the first cushioning part can move in the accommodating cavity along with the lens bearing apparatus, and is in contact with or is separated from the inner wall of the accommodating cavity. When the lens bearing apparatus collides with the inner wall of the accommodating cavity, the first cushioning part comes into contact with the inner wall of the accommodating cavity, and when the lens bearing apparatus moves in an inverse direction, the first cushioning part is separated from the inner wall of the accommodating cavity. The first cushioning part may be made of a single material or a mixed material of several materials. The first cushioning part can cushion impact and reduce impact stress on the lens bearing apparatus and the lens, to protect the lens bearing apparatus and the lens and limit the lens bearing apparatus.

In an implementation, the cushioning part includes a second cushioning part, the second cushioning part is connected between the outer surface of the lens bearing apparatus and the inner wall of the accommodating cavity, and the second cushioning part can be deformed when the lens bearing apparatus moves in the accommodating cavity. The second cushioning part is always connected to the outer surface of the lens bearing apparatus and the inner wall of the accommodating cavity. The second cushioning part may be made of a material that has cushioning performance and damping performance and that can be elastically deformed. Due to the damping performance, the second cushioning part can suppress vibration of the lens bearing apparatus, to reduce or eliminate abnormal sound of the camera motor. In addition, the second cushioning part is soft in texture, and may be deformed when the lens bearing apparatus moves. Therefore, movement of the lens bearing apparatus is not hindered. The second cushioning part can play a role of absorbing impact and reducing impact stress.

In an implementation, the drive apparatus includes a fastening bracket and several pairs of shape memory alloy wires. The fastening bracket is fastened in the accommodating cavity, the outer surface of the lens bearing apparatus is spaced apart from the fastening bracket, the several pairs of shape memory alloy wires are distributed at intervals at a periphery of the lens bearing apparatus, two shape memory alloy wires in each pair of shape memory alloy wires intersect each other, and each shape memory alloy wire is connected between the lens bearing apparatus and the fastening bracket, so that the lens bearing apparatus hangs on the fastening bracket. The several pairs of shape memory alloy wires can be deformed when being powered on, to jointly drive the lens bearing apparatus to move. The drive apparatus can drive, by using a feature of the shape memory alloy wire, the lens bearing apparatus to move, to implement focusing and optical image stabilization. When the cushioning part is disposed in the camera motor that uses the drive apparatus, impact stress on the lens bearing apparatus and the lens can be greatly reduced.

In an implementation, the lens bearing apparatus includes a bearer and a first fitting part. The bearer is configured to fasten the lens. The first fitting part is fastened to an outer surface of the bearer. The cushioning part is disposed on the outer surface of the bearer and/or an outer surface of the first fitting part. The fastening bracket includes a substrate and a second fitting part. The substrate and the bearer are disposed at intervals. The second fitting part is fastened to a periphery of the substrate, and the second fitting part and the first fitting part cooperate with each other and are disposed at intervals. Each shape memory alloy wire is connected between the first fitting part and the second fitting part. When the cushioning part is disposed in such a cooperation structure of the lens bearing apparatus and the drive apparatus, impact stress on the lens bearing apparatus and the lens can be greatly reduced.

According to a third aspect, this application provides a camera module that includes a lens and a camera motor, and the lens is mounted on a lens bearing apparatus. When a cushioning part is disposed, impact stress on the lens bearing apparatus and the lens can be reduced, and a risk of damage to the lens bearing apparatus and the lens can be reduced, thereby ensuring imaging quality.

According to a fourth aspect, this application provides an electronic device that includes a housing and a camera module, and the camera module is mounted inside the housing. The camera module of the electronic device is characterized by high reliability and good imaging quality.

DESCRIPTION OF EMBODIMENTS

An electronic device is provided in the following embodiments of this application. The electronic device includes hut is not limited to a mobile phone, a tablet computer, a notebook computer, an electronic reader, a wearable device, and the like. A mobile phone is used as an example of the electronic device below for description.

Figure 1:
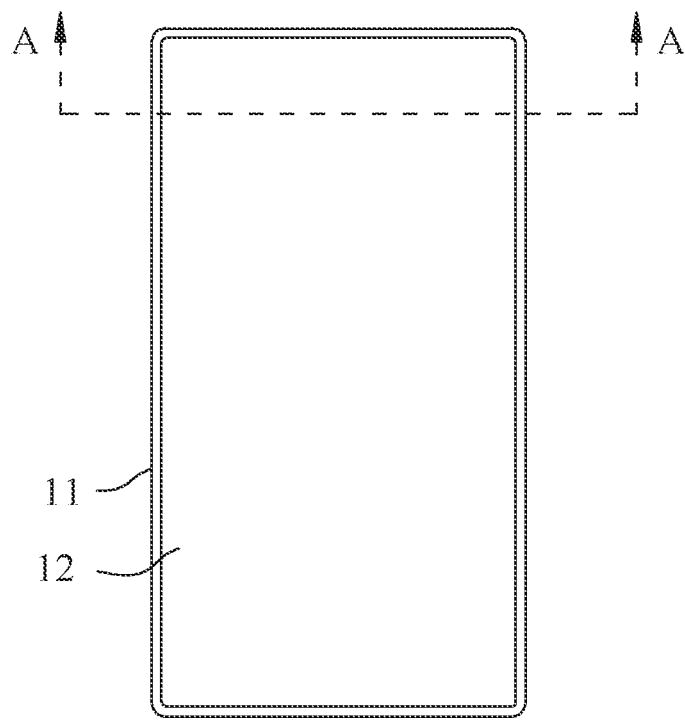
FIG. 1 is a schematic diagram of a front structure of an electronic device according to Embodiment 1.
Figure 2:
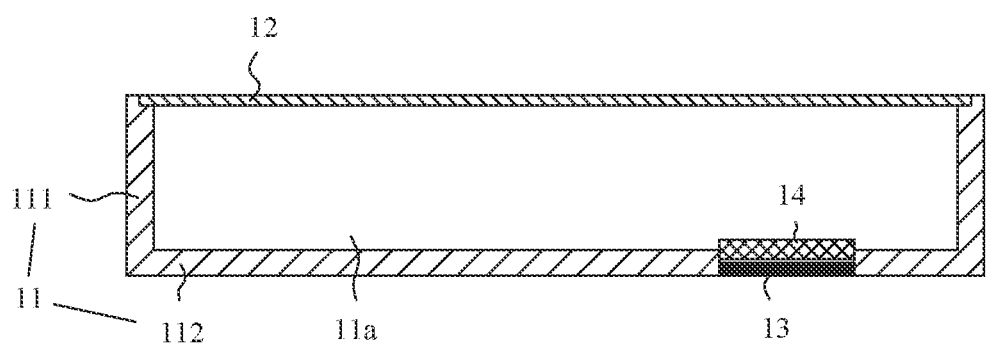
FIG. 2 is a schematic diagram of an A-A sectional structure of an electronic device in FIG. 1.

As shown in FIG. 1 and FIG. 2, an electronic device 10 may include a housing 11, a screen 12, a camera lens 13, and a camera module 14.

The housing 11 may include a body part 112 and a bezel part 111 that is disposed around a periphery of the body part 112, the body part 112 and the bezel part 111 form an inner cavity 11a, and the inner cavity 11a has an opening. A camera hole may be disposed on the body part 112, and the camera lens 13 is mounted in the camera hole.

The screen 12 is mounted in the inner cavity 11a, and protrudes from the opening of the inner cavity 11a. The screen 12 may include a cover plate and a display panel that are superposed. The cover plate is used to protect the display panel. A touch control unit may be built in the display panel, and the display panel has both a display function and a touch control function. Alternatively, a touch control unit may be integrated into the cover plate, in other words, the cover plate is a touch control cover plate, and the display panel has no touch control function. Alternatively, the screen 12 does not include a cover plate, and the screen 12 is a display panel. A protective layer may be disposed on a surface that is of the display panel and that protrudes from the opening, to implement self-protection of the display panel. In this embodiment, the screen 12 may be in a plate shape. In another embodiment, the screen 12 may also be a curved screen. For example, the screen 12 may include a flat part and a curved surface part connected to two opposite sides of the flat part.

The camera module 14 is accommodated in the inner cavity 11a and corresponds to the camera hole. The camera module 14 may receive external light that is incident through the camera lens 13, to collect image information. In this embodiment, a light-collecting surface (light enters the camera module 14 from the light-collecting surface) of the camera module 14 is backward to a display surface (a surface that displays a picture) of the screen 12, in other words, the camera module 14 may be a rear-facing camera module 14. There may be several camera modules 14, for example, one to four. In another embodiment, the light-collecting surface of the camera module 14 is the same as the display surface of the screen 12 in terms of orientations, in other words, the camera module 14 may be a front-facing camera module 14. The front-facing camera module 14 may be an under-screen camera module 14 or an in-screen camera module 14. For the front-facing camera module 14, the camera lens 13 may be canceled.

Figure 3:
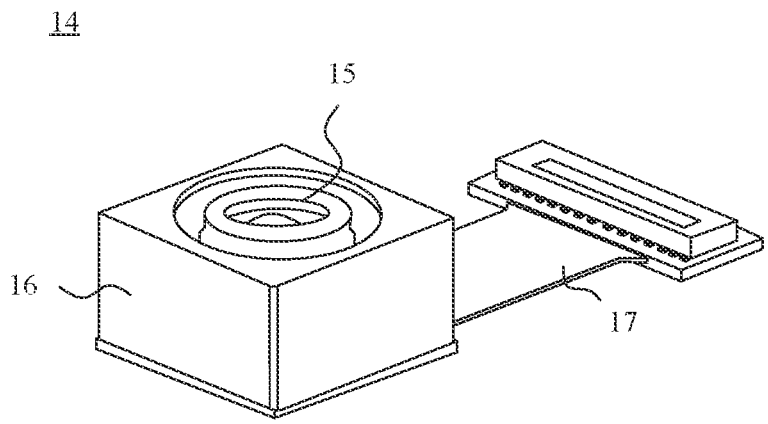
FIG. 3 is a schematic diagram of an assembling structure of a camera module of an electronic device in FIG. 2.
Figure 4:
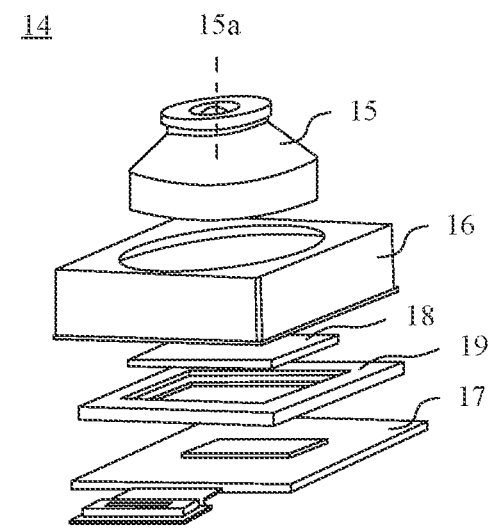
FIG. 4 is a schematic diagram of an exploded structure of a camera module in FIG. 3.

As shown in FIG. 3 and FIG. 4, in Embodiment 1, the camera module 14 may include a lens 15, a camera motor 16, a lens holder 19, an optical filter 18, and a circuit board assembly 17.

As shown in FIG. 4, the lens 15 is mounted on the camera motor 16. The lens 15 has an optical axis 15a, and a direction of the optical axis 15a may be referred to as an optical axis direction. The lens 15 may be driven by the camera motor 16 to move in the optical axis direction to implement focusing. The lens 15 may also move on a circumferential plane (a plane perpendicular to the optical axis 15a) to implement optical image stabilization. A specific structure and a specific type of the lens 15 are not limited in Embodiment 1, for example, the lens 15 may be a large aperture lens.

As shown in FIG. 4, the lens holder 19 is configured to bear the camera motor 16. The lens holder 19 may be partially hollowed to form a mounting slot, the optical filter 18 is disposed in the mounting slot, and external light may pass through the lens 15 to reach the optical filter 18. A material of the optical filter 18 is not limited, for example, may be blue glass. Specific structures of the lens holder 19 and the optical filter 18 are not limited in Embodiment 1.

As shown in FIG. 4, the circuit board assembly 17 and the camera motor 16 are separately located on two opposite sides of the lens holder 19. The circuit board assembly 17 may include a hard circuit board and a flexible circuit board that are connected. An image sensor may be disposed on the hard circuit board, and light passing through the optical filter 18 is collected by the image sensor. A connector may be disposed at one end that is of the flexible circuit board and that is away from the hard circuit board, and the camera module 14 is connected to a mainboard of the electronic device 10 by using the connector. The foregoing structural description of the circuit board assembly 17 is merely an example. Actually, a specific structure of the circuit board assembly 17 may be designed based on a product requirement.

Figure 5:
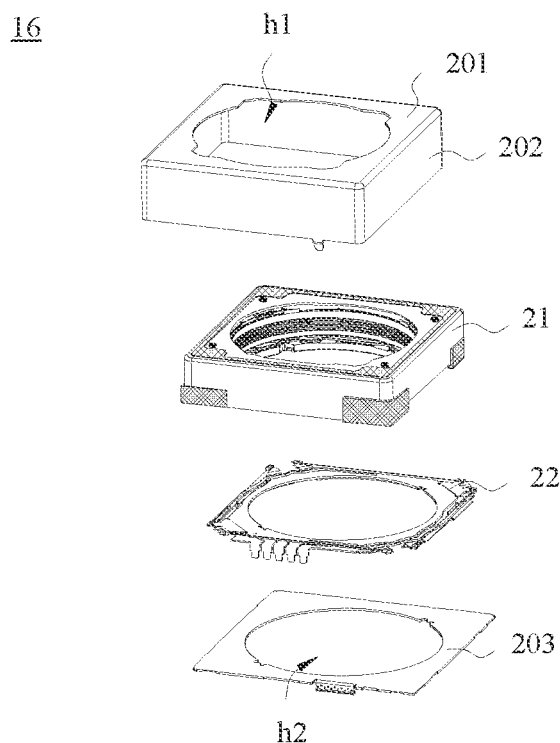
FIG. 5 is a schematic diagram of an exploded structure of a camera motor in a camera module in FIG. 4.

As shown in FIG. 5, the camera motor 16 may include a motor housing, a lens bearing apparatus 21, and a drive apparatus 22.

Figure 7:
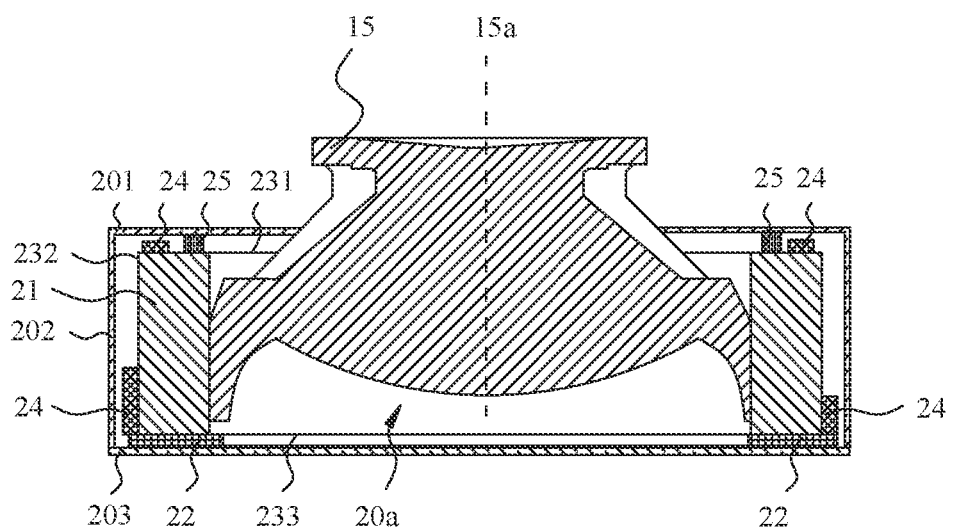
FIG. 7 is a schematic diagram of a simplified cross-sectional structure showing an assembly relationship between a camera motor and a lens in FIG. 5.

The motor housing may include a first cover 201, a side frame 202, and a second cover 203. Both the first cover 201 and the second cover 203 may be in a flat sheet shape, and the first cover 201 may be parallel to or approximately parallel to the second cover 203. A first through hole h1 may be disposed on the first cover 201, a second through hole h2 may be disposed on the second cover 203, and the first through hole h1 may be aligned with the second through hole h2. Both an axis of the first through hole h1 and an axis of the second through hole h2 may be parallel to or approximately parallel to the optical axis direction of the lens 15. The side frame 202 connects the first cover 201 and the second cover 203, and is disposed around a periphery of the first cover 201 and a periphery of the second cover 203. With reference to FIG. 5 and FIG. 7 (FIG. 7 is only a simplified schematic diagram), the first cover 201, the side frame 202, and the second cover 203 may form an accommodating cavity 20a, and the accommodating cavity 20a is configured to accommodate the lens bearing apparatus 21, the lens 15, and the drive apparatus 22. The lens bearing apparatus 21, the drive apparatus 22, and the second cover 203 are sequentially superposed. The second cover 203 is connected to the lens holder 19, so that the entire camera motor 16 is borne on the lens holder 19.

In Embodiment 1, the first cover 201 and the side frame 202 may be connected, and the second cover 203 may be a separate part. This design enables the motor housing to have high structural strength, and facilitates assembly of the drive apparatus 22, the lens bearing apparatus 21, and the lens 15. In another embodiment, the motor housing may have another proper structure, provided that the lens bearing apparatus 21, the lens 15, and the drive apparatus 22 can be accommodated.

Figure 6:
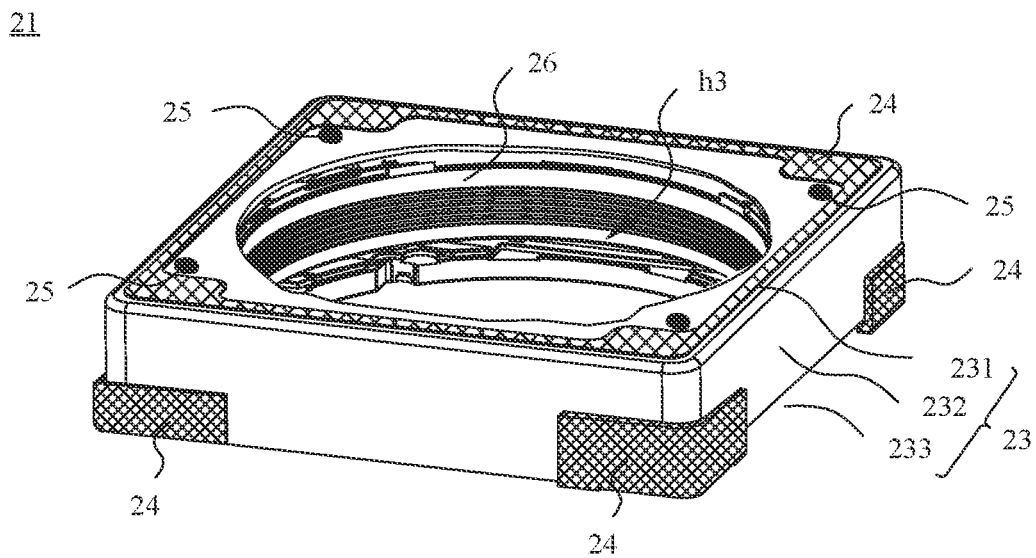
FIG. 6 is a schematic diagram of an assembling structure of a lens bearing apparatus in a camera motor in FIG. 5.

With reference to FIG. 5 to FIG. 7, the lens bearing apparatus 21 may be movably accommodated in the accommodating cavity 20a. The lens bearing apparatus 21 may be, for example, a voice coil motor (Voice Coil Motor, VCM for short).

As shown in FIG. 6 and FIG. 7, the lens bearing apparatus 21 may include a bearer housing 23. An outer surface of the bearer housing 23 may include a first axial surface 231, a second axial surface 233, and a peripheral side surface 232. Both the first axial surface 231 and the second axial surface 233 are perpendicular to or approximately perpendicular to the optical axis direction, the first axial surface 231 is close to the first cover 201, and the second axial surface 233 is away from the first cover 201. The peripheral side surface 232 connects the first axial surface 231 and the second axial surface 233, and is disposed around a periphery of the first axial surface 231 and a periphery of the second axial surface 233. As shown in FIG. 7, both the first axial surface 231 and the peripheral side surface 232 may be spaced apart from an inner wall of the accommodating cavity 20a, and the spacing may be used as activity space of the lens bearing apparatus 21. The second axial surface 233 may be fastened to the drive apparatus 22.

As shown in FIG. 6, a focusing apparatus (which is blocked and not shown) and a lens barrel 26 are mounted in the bearer housing 23. The focusing apparatus may include a permanent magnet and a focusing coil, the focusing coil is in a magnetic field of the permanent magnet, and ampere force in the optical axis direction is applied to the focusing coil when the focusing coil is powered on. The focusing coil is wound around an outer circumference of the lens barrel 26. The lens barrel 26 has a mounting through hole h3, and the mounting through hole h3 is aligned with both the first through hole h1 and the second through hole h2. An axis of the mounting through hole h3 may be parallel to or approximately parallel to the optical axis direction of the lens 15. The lens 15 is fastened in the mounting through hole h3. Under the action of the ampere force, the focusing coil drives the lens barrel 26 and the lens 15 to move in the optical axis direction relative to the bearer housing 23 (for example, moves in an up-down direction relative to the bearer housing 23 in a perspective of FIG. 6), to implement focusing.

The lens bearing apparatus 21 may further include a first spring plate (which is blocked and not shown) disposed in the bearer housing 23, and the first spring plate connects the bearer housing 23 and the lens barrel 26. When the lens barrel 26 moves, the first spring plate can be elastically deformed, and the first spring plate can provide elastic force that is in a reverse direction as the ampere force. Under the joint action of the elastic force and the ampere force, the lens barrel 26 and the lens 15 can stably move to required positions. In addition, when power is off, the first spring plate can be restored from deformation to pull the lens barrel 26 and the lens 15 back to specified positions. The first spring plate can be elastically deformed in the optical axis direction and a direction parallel to the circumferential plane. An elastic coefficient of the first spring plate in the optical axis direction may be relatively small, in other words, the first spring plate is relatively "soft" in the optical axis direction, is easily deformed, and can provide limited elastic force.

In another embodiment, the lens bearing apparatus 21 is not limited to the foregoing voice coil motor, provided that the lens 15 can be driven to move in the optical axis 15a relative to the lens bearing apparatus 21 to implement focusing. For example, the lens bearing apparatus 21 may be a micro-electro-mechanical system (Micro-Electro-Mechanical System, MEMS for short) module.

As shown in FIG. 5 and FIG. 7, the drive apparatus 22 is mounted in the accommodating cavity 20a, and the drive apparatus 22 is located between the lens bearing apparatus 21 and the second cover 203. The drive apparatus 22 may be fastened to a surface of the second cover 203. The drive apparatus 22 is configured to apply driving force to the lens bearing apparatus 21 on the second axial surface 233, to drive the lens bearing apparatus 21 to move on the circumferential plane. Specific descriptions are provided below.

Figure 8:
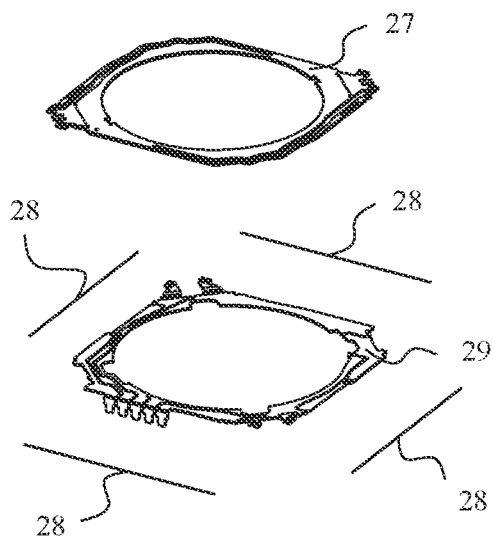
FIG. 8 is a schematic diagram of an exploded structure of a drive apparatus in a camera motor in FIG. 5.

As shown in FIG. 8, the drive apparatus 22 may include a second spring plate 27, a power supply part 29, and four shape memory alloy (Shape Memory Alloys, SMA for short) wires 28. The second spring plate 27 and the power supply part 29 are superposed, and the second spring plate 27 is adjacent to the lens bearing apparatus 21.

Figure 9:
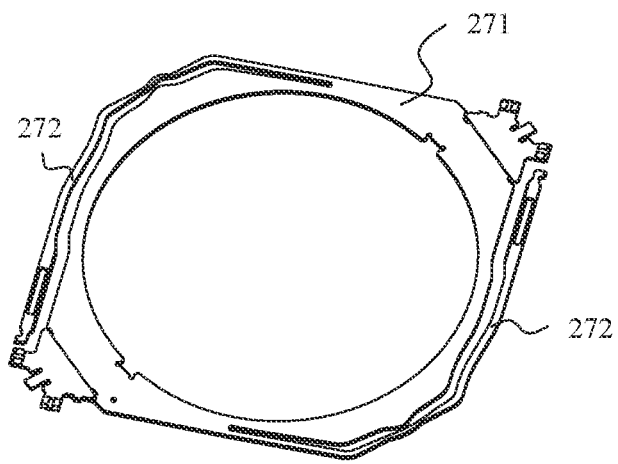
FIG. 9 is a schematic diagram of a three-dimensional structure of a second spring plate of a drive apparatus in FIG. 8.

As shown in FIG. 9, the second spring plate 27 may include a body part 271 and two elastic arms 272. The body part 271 may be in an annular sheet shape. With reference to FIG. 9 and FIG. 8, a surface of the body part 271 toward the power supply part 29 is spaced apart from the power supply part 29. With reference to FIG. 9 and FIG. 7, a surface of the body part 271 toward the lens bearing apparatus 21 is fastened to the second axial surface 233 of the lens bearing apparatus 21. A root of each elastic arm 272 is connected to the body part 271, and at least a part of each elastic arm 272 may be fastened to the power supply part 29. Each elastic arm 272 surrounds a periphery of the body part 271. The two elastic arms 272 are spaced apart, and a free end of one elastic arm 272 is close to a root of the other elastic arm 272.

With reference to FIG. 8 and FIG. 7, the power supply part 29 may be approximately annular, and may be fastened to the second cover 203. The power supply part 29 is configured to supply power to the four shape memory alloy wires.

As shown in FIG. 8, the four shape memory alloy wires 28 are separately disposed around the power supply part 29 and the second spring plate 27, and the four shape memory alloy wires 28 are spaced apart. One end of each shape memory alloy wire 28 is fastened to the power supply part 29, and the other end is fastened to the body part 271. The shape memory alloy wire 28 can be deformed when being powered on, and one end that is of the shape memory alloy wire 28 and that is connected to the body part 271 can apply driving force to the body part 271. Under jointly driving of the four shape memory alloy wires 28, the body part 271 and the lens bearing apparatus 21 can move on the circumferential plane, so that the lens 15 can move on the circumferential plane. Movement of the lens 15 on the circumferential plane can perform displacement compensation on jitter of the lens 15 in the direction parallel to the circumferential plane, to implement optical image stabilization.

The elastic arm 272 of the second spring plate 27 can provide elastic force, and the elastic force is opposite to a direction of driving force applied by the shape memory alloy wire 28. Under the joint action of the elastic arm 272 and the shape memory alloy wires 28, the lens bearing apparatus 21 can stably move to a required position. In addition, when power is off, the elastic force of the elastic arm 272 can pull the lens bearing apparatus 21 back to a specified position. Similar to the foregoing first spring plate, the elastic arm 272 can also be elastically deformed in the optical axis direction. An elastic coefficient of the elastic arm 272 in the optical axis direction is relatively small. The elastic arm 272 is relatively "soft" in the optical axis direction, is easily deformed, and can provide limited elastic force.

In another embodiment, the drive apparatus 22 is not limited to the foregoing structure and feature, provided that the lens bearing apparatus 21 can be driven to move on the circumferential plane, or the lens bearing apparatus 21 is driven to tilt relative to the circumferential plane, thereby implementing optical image stabilization.

With reference to FIG. 7, when the lens bearing apparatus 21 performs image stabilization movement on the circumferential plane, the peripheral side surface 232 collides with the inner wall of the accommodating cavity 20a. When the camera module 14 is impacted, the peripheral side surface 232 and the first axial surface 231 may also collide with the inner wall of the accommodating cavity 20a. When the lens 15 is a relatively heavy large aperture lens, impact stress on the lens bearing apparatus 21 and the lens 15 increases, and it is very likely to cause collision damage and failure to the lens bearing apparatus 21 and the lens 15. For example, the permanent magnet in the lens bearing apparatus 21 may be broken due to collision, and a focusing failure may occur on the lens 15 to cause imaging abnormality.

To overcome this disadvantage, as shown in FIG. 6 and FIG. 7, a first cushioning part 24 (to clearly identify the first cushioning part 24, the first cushioning part 24 is schematically represented by using shadow) may be fixedly disposed on both the first axial surface 231 and the peripheral side surface 232, and the first cushioning part 24 can move in the accommodating cavity 20a along with the lens bearing apparatus 21 When the lens bearing apparatus 21 collides with the inner wall of the accommodating cavity 20a, the first cushioning part 24 may come into contact with the inner wall of the accommodating cavity 20a. The first cushioning part 24 may also be separated from the inner wall of the accommodating cavity 20a as the lens bearing apparatus 21 moves.

The first cushioning part 24 may be made of a material that can absorb impact energy, such as liquid silica gel, rubber, plastic (such as a liquid crystal polymer, LCP for short), foam, Mylar (Mylar), or resin. The first cushioning part 24 may be made of a single material or a mixture of several materials. For example, the first cushioning part 24 may be made of a mixed material of an LCP and rubber. The mixed material is characterized by both strength and toughness, so that the first cushioning part 24 can cushion impact and reduce impact stress on the lens bearing apparatus 21 and the lens 15, thereby protecting the lens bearing apparatus 21 and the lens 15 and limiting the lens bearing apparatus 21.

The first cushioning part 24 may be disposed in an area with relatively large impact stress, to implement a maximum extent of cushioning. For example, as shown in FIG. 6, first cushioning parts 24 may be distributed in some areas of the first axial surface 231, and the first cushioning parts 24 on the first axial surface 231 may be connected. A plurality of first cushioning parts 24 may be distributed in some areas of the peripheral side surface 232 at intervals, and the plurality of first cushioning parts 24 may be, for example, located in four corner areas on the peripheral side surface 232. Certainly, the first cushioning parts 24 may also be distributed in all areas on the first axial surface 231 and all areas on the peripheral side surface 232. Alternatively, the first cushioning parts 24 may be distributed only on the peripheral side surface 232 or the first axial surface 231.

The first cushioning part 24 may be integrally formed with the bearer housing 23 of the lens bearing apparatus 21. For example, double-shot molding may be performed on a material of the bearer housing 23 and a material that can be easily molded, such as silica gel or rubber. Alternatively, the first cushioning part 24 may be assembled to the bearer housing 23. For example, the first cushioning part 24 may be fabricated by using a material that can be easily bonded, such as foam or Mylar, and the first cushioning part 24 is bonded to the bearer housing 23. For another example, the first cushioning part 24 may be made of a proper material, and a connection structure is disposed on the bearer housing 23. The first cushioning part 24 is fastened to the bearer housing 23 by using the connection structure. The connection structure is not limited to a slot, a mounting hole, and the like. A shape of the first cushioning part 24 may be designed based on a requirement, and is not limited to a hump, a strip, a block, or the like.

In Embodiment 1, because the first cushioning part 24 is disposed on an outer surface of the lens bearing apparatus 21, the lens bearing apparatus 21 can obtain better cushioning protection regardless of any position to which the lens bearing apparatus 21 moves. In this design, cushioning protection of the lens bearing apparatus 21 can be implemented with a relatively high yield rate by using a relatively small quantity of cushioning materials and a relatively simple structure.

On the contrary, if the first cushioning part 24 is disposed on an inner surface of the motor housing, it is difficult to accurately learn an area of the inner surface in which the first cushioning part 24 collides with the lens bearing apparatus 21. To comprehensively protect the lens bearing apparatus 21, a cushioning material needs to be disposed on the entire inner surface. Consequently, consumption of the cushioning material is increased. Alternatively, if the first cushioning part 24 is disposed inside the lens bearing apparatus 21 (for example, on an outer wall of the lens barrel 26), because an internal structure of the lens bearing apparatus 21 is very complex, adding the first cushioning part 24 inside the lens bearing apparatus 21 greatly increases structural design, production, and assembly difficulty. In addition, when the lens bearing apparatus 21 moves or is impacted, the lens bearing apparatus 21 may squeeze and rub the first cushioning part 24, and fragments generated by the first cushioning part 24 easily fall on the lens 15, the optical filter 18, or an image sensor, and consequently, imaging is affected.

In Embodiment 1, when the lens 15 is a relatively heavy large aperture lens, load of the lens bearing apparatus 21 increases, and both the first spring plate in the lens bearing apparatus 21 and the second spring plate 27 in the drive apparatus 22 are relatively "soft" in the optical axis direction, so that elastic force that can be provided is limited, and the lens bearing apparatus 21 cannot be properly stabilized. Therefore, the lens bearing apparatus 21 is prone to vibration or forced vibration, and consequently abnormal sound occurs on the camera motor 16.

To suppress vibration of the camera motor 16, as shown in FIG. 6 and FIG. 7, a second cushioning part 25 (to clearly identify the second cushioning part 25, and the second cushioning part 25 is schematically represented by using shadow) may further be disposed between the first axial surface 231 and the first cover 201, and the second cushioning part 25 connects the first axial surface 231 and the first cover 201. The second cushioning part 25 may be made of a material that has cushioning performance and damping performance and that can be elastically deformed, such as damping glue. Due to the damping performance, the second cushioning part 25 can suppress vibration of the lens bearing apparatus 21, to reduce or eliminate the abnormal sound on the camera motor 16. In addition, the second cushioning part 25 is soft in texture, and may be deformed when the lens bearing apparatus 21 moves. Therefore, movement of the lens bearing apparatus 21 is not hindered. Certainly, the second cushioning part 25 can also play a role of absorbing impact and reducing impact of impact stress. It may be understood that, for any type of lens 15, the second cushioning part 25 may be disposed to perform vibration absorption and cushioning, and is not limited to the large aperture lens.

Second cushioning parts 25 may be distributed in an area with relatively high vibration strength, to suppress vibration to a maximum extent. For example, as shown in FIG. 6, one second cushioning part 25 may be disposed on each of four former positions on the first axial surface 231. Certainly, the second cushioning parts 25 may also be distributed in another area on the first axial surface 231. To further suppress vibration, the second cushioning part 25 may be further connected between the peripheral side surface 232 and the side frame 202. Alternatively, the second cushioning part 25 may be disposed only between the peripheral side surface 232 and the side frame 202. A shape of the second cushioning part 25 may be designed based on a requirement, and is not limited to a hump, a strip, a block, or the like.

In Embodiment 1, the second cushioning part 25 and the first cushioning part 24 may be collectively referred to as a cushioning part. In another embodiment, the second cushioning part 25 and the first cushioning part 24 do not need to exist simultaneously. For example, only the first cushioning part 24 may be disposed based on a product requirement, or only the second cushioning part 25 may be disposed.

In Embodiment 2, different from the foregoing Embodiment 1, the drive apparatus does not drive the lens bearing apparatus 21 by using the shape memory alloy wire, but by using interaction between an image stabilization coil and a magnetic field. In addition, the lens bearing apparatus 21 is suspended relative to the drive apparatus.

Figure 10:
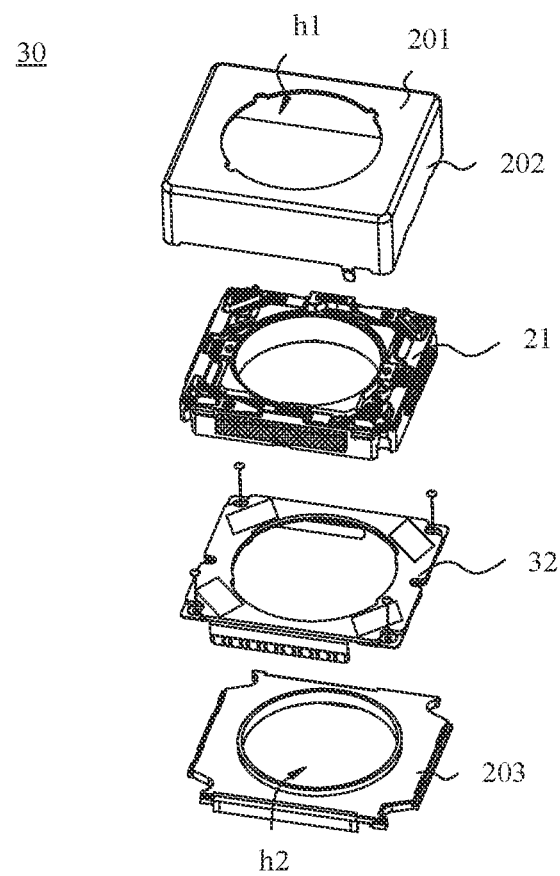
FIG. 10 is a schematic diagram of an exploded structure of a camera motor in Embodiment 2.
Figure 11:
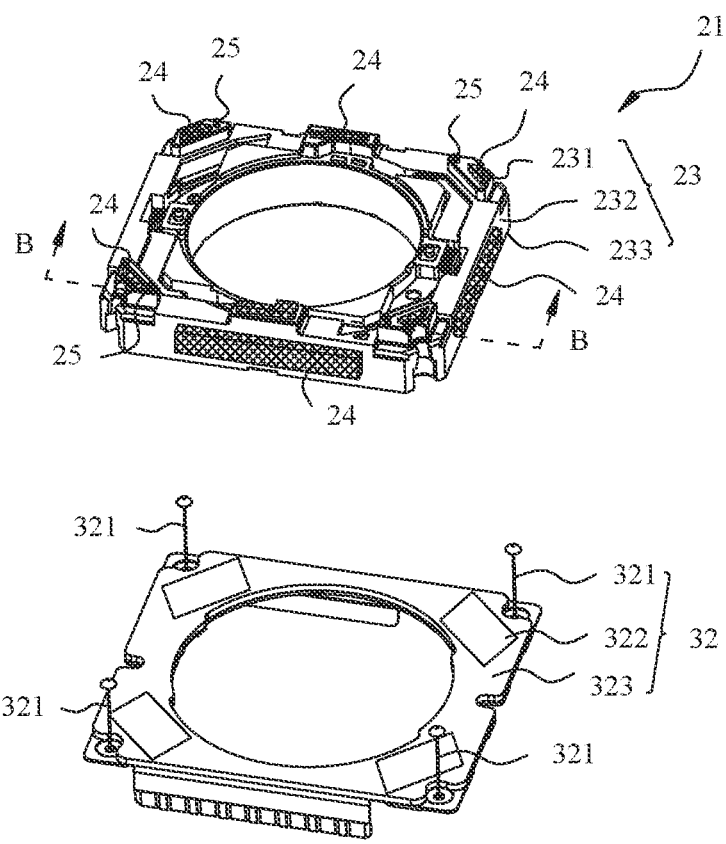
FIG. 11 is a schematic diagram of a three-dimensional structure of a lens bearing apparatus and a drive apparatus in a camera motor in FIG. 10.

In Embodiment 2, as shown in FIG. 10 and FIG. 11, a drive apparatus 32 in a camera motor 30 includes a power supply part 323, an image stabilization coil 322, and four elastic columns 321.

Both the power supply part 323 and the image stabilization coil 322 may be fastened to the second cover 203, and both the power supply part 323 and the image stabilization coil 322 may be spaced apart from the second axial surface 233 of the lens bearing apparatus 21. The power supply part 323 is fastened to the image stabilization coil 322, and the power supply part 323 is configured to supply power to the image stabilization coil 322. The image stabilization coil 322 is located in a magnetic field of the permanent magnet in the lens bearing apparatus 21. When the image stabilization coil 322 is powered on, ampere force is applied to the image stabilization coil 322, and the ampere force is in the direction parallel to the circumferential plane. Because the image stabilization coil 322 is fastened and the lens bearing apparatus 21 is movable, the image stabilization coil 322 may reversely drive the permanent magnet, so that the lens bearing apparatus 21 moves on the circumferential plane, thereby implementing optical image stabilization.

As shown in FIG. 11, the four elastic columns 321 may be separately disposed at four corners of the power supply part 323. Each elastic column 321 may be made of a conductor material with good bending performance, such as copper. One end of each elastic column 321 is fastened to the power supply part 323, and the other end is fastened to the lens bearing apparatus 21. By using the four elastic columns 321, the lens bearing apparatus 21 may be suspended above the power supply part 323. The elastic column 321 may further play a role of conducting electricity, to electrically connect the power supply part 323 to the focusing coil in the lens bearing apparatus 21.

When the lens bearing apparatus 21 moves, the elastic column 321 is bent when being pulled by the lens bearing apparatus 21. The lens bearing apparatus 21 can stably move to a required position under the joint action of the image stabilization coil 322, the permanent magnet, and the elastic column 321. When power is off, the elastic column 321 can be restored from deformation to pull the lens bearing apparatus 21 back to the specified position.

In another embodiment, a quantity and/or locations of the elastic columns 321 are not limited to those described above, provided that the lens bearing apparatus 21 can be supported and stabilized. The elastic column 321 may also be made of a non-conductor, and may supply power to the lens bearing apparatus 21 in another manner. Alternatively, the elastic column 321 may be replaced with another structure capable of providing elastic force.

Figure 12:
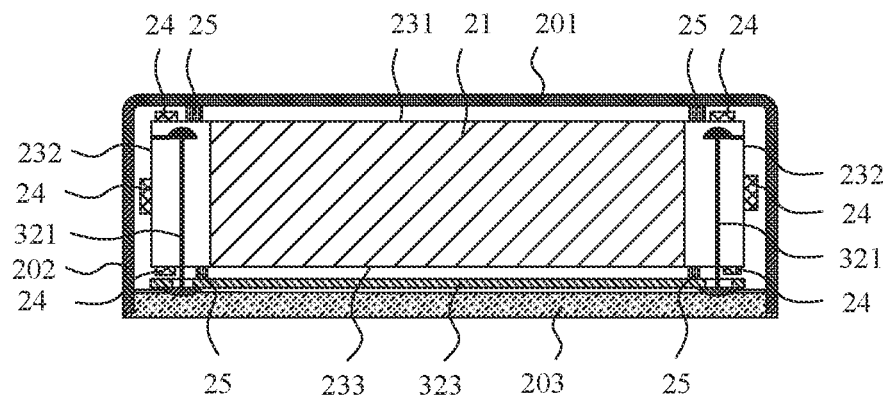
FIG. 12 is a schematic diagram of a simplified structure obtained after a camera motor in Embodiment 2 is sectioned along a B-B cross-section in FIG. 11.

With reference to FIG. 11 and FIG. 12, compared with Embodiment 1, the second axial surface 233 of the lens bearing apparatus 21 in Embodiment 2 is also spaced apart from the drive apparatus 32. When the camera module 14 is impacted, the second axial surface 233 may collide with the drive apparatus 32, and consequently, impact stress on the lens bearing apparatus 21 and the lens 15 further increases. Therefore, in addition to that the first cushioning part 24 is disposed on the first axial surface 231 and the peripheral side surface 232 of the lens bearing apparatus 21, the first cushioning part 24 may be disposed on the second axial surface 233, to absorb impact energy to a maximum extent, and reduce impact stress on the lens bearing apparatus 21. In another embodiment, the first cushioning part 24 may be disposed only on any one surface or any two surfaces in the first axial surface 231, the peripheral side surface 232, and the second axial surface 233.

With reference to FIG. 11 and FIG. 12, in Embodiment 2, to suppress vibration of the lens bearing apparatus 21, the second cushioning part 25 may be disposed between the first axial surface 231 and the first cover 201 and the first axial surface 231 is connected to the first cover 201. The second cushioning part 25 is disposed between the second axial surface 233 and the power supply part 323, and the second axial surface 233 is connected to the power supply part 323.

In another embodiment, the second cushioning part 25 may be connected only between the first axial surface 231 and the first cover 201, or only between the second axial surface 233 and the second cover 203. Alternatively, the second cushioning part 25 may be simultaneously connected between the peripheral side surface 232 and the side frame 202, between the first axial surface 231 and the first cover 201, and between the second axial surface 233 and the second cover 203. Alternatively, the second cushioning part 25 may be connected only between the peripheral side surface 232 and the side frame 202 and between the first axial surface 231 and the first cover 201. Alternatively, the second cushioning part 25 may be connected only between the peripheral side surface 232 and the side frame 202 and between the second axial surface 233 and the second cover 203. Alternatively, the second cushioning part 25 may be connected only between the peripheral side surface 232 and the side frame 202. Alternatively, the second cushioning part 25 and the first cushioning part 24 do not need to exist simultaneously. For example, only the first cushioning part 24 may be disposed based on a product requirement, or only the second cushioning part 25 may be disposed.

Figure 13:
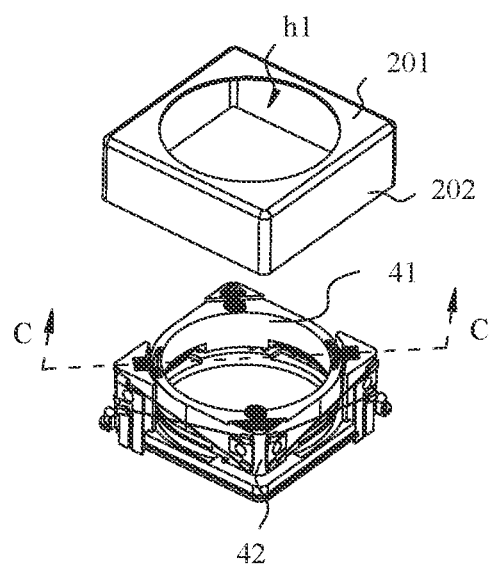
FIG. 13 is a schematic diagram of an exploded structure of a camera motor in Embodiment 3.
Figure 14:
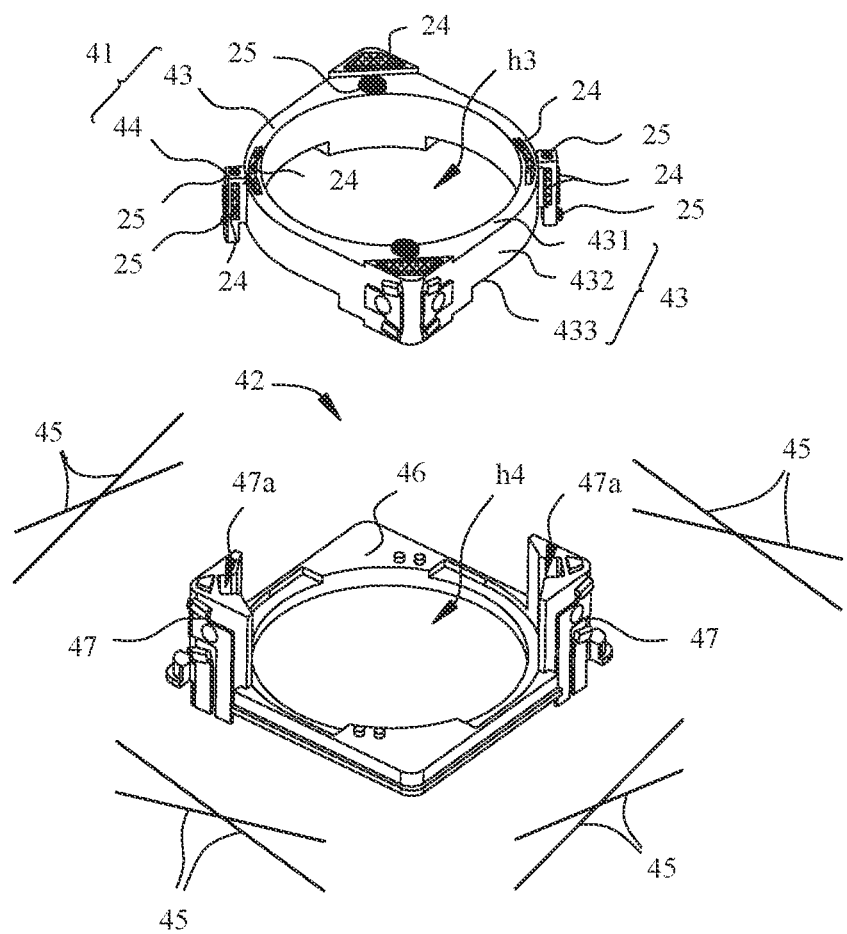
FIG. 14 is a schematic diagram of an exploded structure obtained after a motor housing is removed from a camera motor in FIG. 13.

As shown in FIG. 13 and FIG. 14, in Embodiment 3, different from Embodiment 1, a motor housing of a camera motor 40 may include a first cover 201 and a side frame 202, and does not include a second cover 203. A lens bearing apparatus 41 does not drive a lens 15 to perform focusing movement, the lens bearing apparatus 41 is only used to fasten the lens 15, and there is no relative movement between the lens bearing apparatus 41 and the lens 15. A drive apparatus 42 may drive, by using deformation of a shape memory alloy wire, the lens bearing apparatus 41 to move, to implement focusing and optical image stabilization for the lens 15. Specific descriptions are provided below.

As shown in FIG. 13 and FIG. 14, the lens bearing apparatus 41 may include a bearer 43 and a first fitting part 44. The bearer 43 is close to the first cover 201. The bearer 43 may be approximately annular, and annular space enclosed by the bearer 43 is the mounting through hole h3. The bearer 43 may be sleeved on an outer circumference of the lens 15 to fasten the lens 15. The bearer 43 may have a first axial surface 431, a peripheral side surface 432, and a second axial surface 433. The first axial surface 431, the peripheral side surface 432, and the second axial surface 433 may each be spaced apart from an accommodating cavity of the motor housing. The first fitting part 44 protrudes from the peripheral side surface 432. There may be two first fitting parts 44, the two first fitting parts 44 are separately located on two opposite sides of the peripheral side surface 432, and the two first fitting parts 44 may be symmetrical about the axis of the mounting through hole h3. The first fitting part 44 may be approximately columnar.

As shown in FIG. 13 and FIG. 14, the drive apparatus 42 may include a fastening bracket and four pairs of shape memory alloy wires 45.

The fastening bracket is fastened. The fastening bracket may include a substrate 46 and a second fitting part 47. The substrate 46 is located on a side that is of the bearer 43 and that is away from the first cover 201. The substrate 46 may be approximately in a plate shape, a third through hole h4 may be disposed on the substrate 46, and the third through hole h4 may be aligned with the mounting through hole h3. The substrate 46 may be similar to the foregoing second cover 203, a side frame 202 of the motor housing may be connected to the substrate 46, and the substrate 46 may be connected to the lens holder 19. The second fitting part 47 is fastened to a periphery of the substrate 46, the second fitting part 47 may be approximately columnar, and an extension direction of the second fitting part 47 may be substantially parallel to an axis of the third through hole h4. The second fitting part 47 may form a fitting groove 47a, and the fitting groove 47a cooperates with the first fitting part 44. There may be two second fitting parts 47, the two second fitting parts 47 are separately located on two opposite sides of the substrate 46, and the two second fitting parts 47 may be symmetrical about the axis of the third through hole h4.

The four pairs of shape memory alloy wires 45 may be separately disposed around the fastening bracket, and the four pairs of shape memory alloy wires 45 are spaced apart. Two shape memory alloy wires 45 in each pair of shape memory alloy wires 45 intersect each other. One end of each memory alloy wire is fastened to the second fitting part 47 of the fastening bracket, and the other end is fastened to the first fitting part 44 of the lens bearing apparatus 41.

Figure 15:
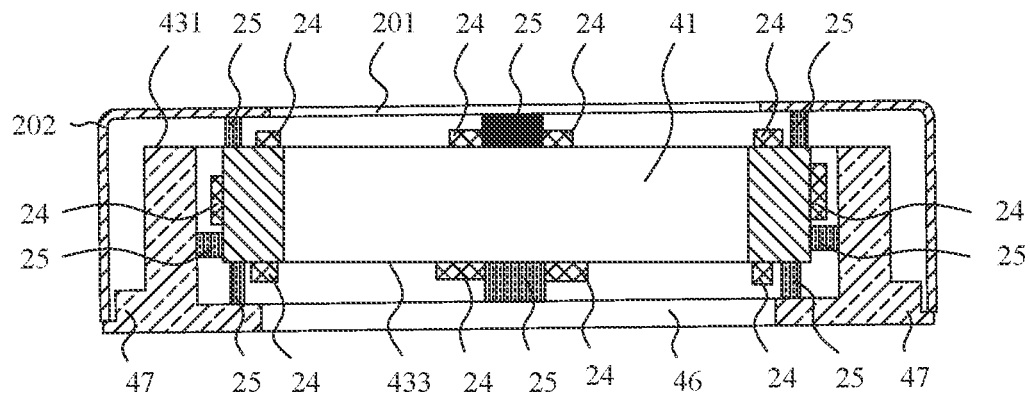
FIG. 15 is a schematic diagram of a simplified structure obtained after a camera motor in Embodiment 3 is sectioned along a C-C cross-section in FIG. 13.

Therefore, with reference to FIG. 13 to FIG. 15 (FIG. 15 is a cross-sectional view obtained after the camera motor 40 is sectioned along a C-C section in FIG. 13. To highlight a key structure, the cross-sectional view is simplified.), the lens bearing apparatus 41 may hang on the fastening bracket by using the four pairs of shape memory alloy wires 45, so that the peripheral side surface 432 is spaced apart from a surface of the second fitting part 47, the second axial surface 433 is spaced apart from a surface of the substrate 46, and the first fitting part 44 is spaced apart from a groove wall of the fitting groove 47a.

Each shape memory alloy wire 45 may be deformed when being powered on, to apply driving force to the lens bearing apparatus 41. Under joint driving of the four pairs of shape memory alloy wires 45, the lens bearing apparatus 41 and the lens 15 can move in the optical axis direction and the direction parallel to the circumferential plane, to implement focusing and optical image stabilization.

With reference to FIG. 13 to FIG. 15, when the lens bearing apparatus 41 performs image stabilization movement and focusing movement, or the camera module 14 is impacted, the lens bearing apparatus 41 easily collides with the motor housing, the substrate 46 of the fastening bracket, or the second fitting part 47 of the fastening bracket, and consequently, impact stress on the lens bearing apparatus 41 and the lens 15 is increased dramatically. Therefore, the first cushioning part 24 may be disposed on the first axial surface 431, the peripheral side surface 432, and the second axial surface 433 of the lens bearing apparatus 41, and a surface on which the lens bearing apparatus 41 cooperates with the fitting groove 47a, to absorb impact energy to a maximum extent, and reduce impact stress on the lens bearing apparatus 41. In another embodiment, the first cushioning part 24 may be disposed only on any one surface, any two surfaces, or any three surfaces in the first axial surface 431, the peripheral side surface 432, the second axial surface 433, and the surface on which the lens bearing apparatus 41 cooperates with the fitting groove 47a.

With reference to FIG. 13 to FIG. 15, to suppress vibration of the lens bearing apparatus 41, a second cushioning part 25 may be disposed between the first axial surface 431 and the first cover 201 to connect the first axial surface 431 and the first cover 201, the second cushioning part 25 may be disposed between the second axial surface 433 and the substrate 46 to connect the second axial surface 433 and the substrate 46, the second cushioning part 25 may be disposed between the peripheral side surface 432 and the second fitting part 47 to connect the peripheral side surface 432 and the second fitting part 47, and the second cushioning part 25 may be disposed between the first fitting part 44 and the second fitting part 47 to connect the first fitting part 44 and the second fitting part 47.

In another embodiment, the second cushioning part 25 may connect any outer surface of the lens bearing apparatus 41 and the motor housing, or the second cushioning part 25 may connect any outer surface of the lens bearing apparatus 41 and the fastening bracket. Alternatively, the second cushioning part 25 and the first cushioning part 24 do not need to exist simultaneously. For example, only the first cushioning part 24 may be disposed based on a product requirement, or only the second cushioning part 25 may be disposed.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A camera motor configured to drive a lens, wherein the camera motor comprises:
   a motor housing comprising an accommodating cavity, wherein the accommodating cavity comprises an inner wall;
   a lens bearing apparatus accommodated in the accommodating cavity and spaced apart from the inner wall, wherein the lens bearing apparatus comprises an outer surface, wherein the outer surface comprises an axial plane surface that is parallel to an optical axis direction of the lens and a circumferential axis plane surface that is perpendicular to the optical axis direction of the lens, and wherein the lens bearing apparatus is configured to:
      bear the lens; and
      drive the lens to move in the optical axis direction of the lens relative to the outer surface;
   a drive apparatus accommodated in the accommodating cavity and configured to drive the lens bearing apparatus to move in the accommodating cavity; and
   a cushioning part disposed on the outer surface and comprising:
      a first cushioning part in contact with or separated from the inner wall and configured to move in the accommodating cavity along with the lens bearing apparatus; and
      a second cushioning part coupling the outer surface and the inner wall and configured to deform when the lens bearing apparatus moves in the accommodating cavity,
      wherein the first cushioning part and the second cushioning part are both disposed on a same one of the axial plane surface or the circumferential axis plane surface of the lens bearing apparatus.

2. The camera motor of claim 1, wherein the lens bearing apparatus further comprises a mounting through hole configured to mount the lens, wherein the outer surface comprises a peripheral side surface surrounding an axis of the mounting through hole, wherein the peripheral side surface is spaced apart from the inner wall, and wherein the cushioning part is disposed on the peripheral side surface.

3. The camera motor of claim 2, wherein the peripheral side surface is coupled to a periphery of the axial plane surface, wherein the axial plane surface is spaced apart from the inner wall, and wherein the cushioning part is disposed on the axial plane surface.

4. The camera motor of claim 2, wherein the drive apparatus is further configured to further drive the lens bearing apparatus to move on a plane perpendicular to the axis.

5. The camera motor of claim 4, wherein the drive apparatus comprises:
 a power supply part fastened in the accommodating cavity;
 a spring plate located between the lens bearing apparatus and the power supply part and comprising:
  a body part fastened to the lens bearing apparatus; and
  an elastic arm coupled to the body part and fastened to the power supply part; and
 a shape memory alloy wire comprising:
  a first end fastened to the power supply part; and
  a second end fastened to the body part,
  wherein the shape memory alloy wire is configured to:
   receive power from the power supply part; and
   deform to drive the body part and the lens bearing apparatus to move when being powered on.

6. The camera motor of claim 4, wherein the lens bearing apparatus further comprises a permanent magnet disposed inside the lens bearing apparatus, and wherein the drive apparatus comprises:
 a power supply part spaced apart from the lens bearing apparatus and fastened in the accommodating cavity; and
 a coil spaced apart from the lens bearing apparatus, fastened in the accommodating cavity, fastened to the power supply part, and configured to apply a driving force to the permanent magnet when being powered on to drive the lens bearing apparatus to move.

7. The camera motor of claim 6, wherein the drive apparatus comprises an elastic column comprising:
 a first end fastened to the power supply part; and
 a second end fastened to the lens bearing apparatus,
 wherein the elastic column is configured to elastically bend when pulled by the lens bearing apparatus.

8. A camera motor configured to drive a lens, wherein the camera motor comprises:
 a motor housing comprising an accommodating cavity, wherein the accommodating cavity comprises an inner wall;
 a lens bearing apparatus accommodated in the accommodating cavity and spaced apart from the inner wall, wherein the lens bearing apparatus is configured to fasten the lens to make the lens and the lens bearing apparatus be still, wherein the lens bearing apparatus comprises a first outer surface, and wherein the first outer surface comprises an axial plane surface that is parallel to an optical axis direction of the lens and a circumferential axis plane surface that is perpendicular to the optical axis direction of the lens;
 a drive apparatus configured to drive the lens bearing apparatus to move in the optical axis direction of the lens and move on a plane perpendicular to the optical axis direction; and
 a cushioning part disposed on the first outer surface and comprising:
  a first cushioning part in contact with or separated from the inner wall and configured to move in the accommodating cavity along with the lens bearing apparatus; and
  a second cushioning part coupling the first outer surface and the inner wall and configured to deform when the lens bearing apparatus moves in the accommodating cavity,
  wherein the first cushioning part and the second cushioning part are both disposed on a same one of the axial plane surface or the circumferential axis plane surface of the lens bearing apparatus.

9. The camera motor of claim 8, wherein the drive apparatus comprises:
 a fastening bracket fastened in the accommodating cavity and spaced apart from the first outer surface; and
 a plurality of pairs of shape memory alloy wires distributed at intervals at a periphery of the lens bearing apparatus, wherein two shape memory alloy wires in each of the pairs of shape memory alloy wires intersect each other, wherein each shape memory alloy wire is coupled between the lens bearing apparatus and the fastening bracket to make the lens bearing apparatus hang on the fastening bracket, and wherein the pairs of shape memory alloy wires are configured to deform to jointly drive the lens bearing apparatus to move when powered on.

10. The camera motor of claim 9, wherein the lens bearing apparatus comprises:
 a bearer comprising a second outer surface and configured to fasten the lens; and
 a first fitting part fastened to the second outer surface and comprising a third outer surface,
 wherein the cushioning part is disposed on the second outer surface and the third outer surface, and
 wherein the fastening bracket comprises:
  a substrate, wherein the substrate and the bearer are disposed at intervals; and
  a second fitting part fastened to a periphery of the substrate,
  wherein the second fitting part and the first fitting part cooperate with each other and are disposed at intervals, and
  wherein each of the shape memory alloy wires is wire is coupled between the first fitting part and the second fitting part.

11. The camera motor of claim 9, wherein the lens bearing apparatus comprises:
 a bearer comprising a second outer surface and configured to fasten the lens; and
 a first fitting part fastened to the second outer surface and comprising a third outer surface,
 wherein the cushioning part is disposed on the second outer surface, and
 wherein the fastening bracket comprises:
  a substrate, wherein the substrate and the bearer are disposed at intervals; and
  a second fitting part fastened to a periphery of the substrate,
  wherein the second fitting part and the first fitting part cooperate with each other and are disposed at intervals, and
  wherein each of the shape memory alloy wires is wire is coupled between the first fitting part and the second fitting part.

12. The camera motor of claim 9, wherein the lens bearing apparatus comprises:
 a bearer comprising a second outer surface and configured to fasten the lens; and
 a first fitting part fastened to the second outer surface and comprising a third outer surface, wherein the cushioning part is disposed on the third outer surface, and wherein the fastening bracket comprises:
- a substrate, wherein the substrate and the bearer are disposed at intervals; and
- a second fitting part fastened to a periphery of the substrate, wherein the second fitting part and the first fitting part cooperate with each other and are disposed at intervals, and wherein each of the shape memory alloy wires is coupled between the first fitting part and the second fitting part.

13. A camera system comprising:
a lens; and
a camera motor comprising:
- a motor housing comprising an accommodating cavity, wherein the accommodating cavity comprises an inner wall;
- a lens bearing apparatus accommodated in the accommodating cavity and is spaced apart from the inner wall, wherein the lens bearing apparatus comprises an outer surface, wherein the outer surface comprises an axial plane surface that is parallel to an optical axis direction of the lens and a circumferential axis plane surface that is perpendicular to the optical axis direction of the lens, and wherein the lens bearing apparatus is configured to:
  - bear the lens mounted on the lens bearing apparatus; and
  - drive the lens to move in the optical axis direction of the lens relative to the outer surface;
- a drive apparatus accommodated in the accommodating cavity and configured to drive the lens bearing apparatus to move in the accommodating cavity; and
- a cushioning part disposed on the outer surface and comprising:
  - a first cushioning part in contact with or separated from the inner wall and configured to move in the accommodating cavity along with the lens bearing apparatus; and
  - a second cushioning part coupled between the outer surface and the inner wall and configured to deform when the lens bearing apparatus moves in the accommodating cavity, wherein the first cushioning part and the second cushioning part are both disposed on a same one of the axial plane surface or the circumferential axis plane surface of the lens bearing apparatus.

14. An electronic device comprising:
a housing; and
a camera system mounted inside the housing and comprising:
  a lens; and
  a camera motor comprising:
  - a motor housing comprising an accommodating cavity, wherein the accommodating cavity comprises an inner wall;
  - a lens bearing apparatus accommodated in the accommodating cavity and spaced apart from the inner wall, wherein the lens bearing apparatus comprises an outer surface, wherein the outer surface comprises an axial plane surface that is parallel to an optical axis direction of the lens and a circumferential axis plane surface that is perpendicular to the optical axis direction of the lens, and wherein the lens bearing apparatus is configured to:
    - bear the lens mounted on the lens bearing apparatus; and
    - drive the lens to move in the optical axis direction of the lens relative to the outer surface;
  - a drive apparatus accommodated in the accommodating cavity and configured to drive the lens bearing apparatus to move in the accommodating cavity; and
  - a cushioning part disposed on the outer surface and comprising:
    - a first cushioning part in contact with or separated from the inner wall and configured to move in the accommodating cavity along with the lens bearing apparatus; and
    - a second cushioning part coupled between the outer surface and the inner wall and configured to deform when the lens bearing apparatus moves in the accommodating cavity,
    wherein the first cushioning part and the second cushioning part are both disposed on a same one of the axial plane surface or the circumferential axis plane surface of the lens bearing apparatus.

15. The electronic device of claim 14, wherein the lens bearing apparatus further comprises a mounting through hole configured to mount the lens, wherein the outer surface comprises a peripheral side surface surrounding an axis of the mounting through hole, wherein the peripheral side surface is spaced apart from the inner wall, and wherein the cushioning part is disposed on the peripheral side surface.

16. The electronic device of claim 15, wherein the peripheral side surface is coupled to a periphery of the axial plane surface, wherein the axial plane surface is spaced apart from the inner wall, and wherein the cushioning part is disposed on the axial plane surface.

17. The electronic device of claim 15, wherein the drive apparatus is further configured to further drive the lens bearing apparatus to move on a plane perpendicular to the axis.

18. The electronic device of claim 17, wherein the drive apparatus comprises:
- a power supply part fastened in the accommodating cavity;
- a spring plate located between the lens bearing apparatus and the power supply part and comprises:
  - a body part fastened to the lens bearing apparatus; and
  - an elastic arm coupled to the body part and fastened to the power supply part; and
- a shape memory alloy wire comprising:
  - a first end fastened to the power supply part; and
  - a second end fastened to the body part,
  wherein the shape memory alloy wire is configured to:
    - receive power from the power supply part; and
    - deform to drive the body part and the lens bearing apparatus to move when being powered on.

19. The electronic device of claim 17, wherein the lens bearing apparatus further comprises a permanent magnet disposed inside the lens bearing apparatus, and wherein the drive apparatus comprises:
- a power supply part spaced apart from the lens bearing apparatus and fastened in the accommodating cavity; and
- a coil spaced apart from the lens bearing apparatus, fastened in the accommodating cavity, and fastened to the power supply part and configured to apply a driving force to the permanent magnet when being powered on to drive the lens bearing apparatus to move.

20. The electronic device of claim 19, wherein the drive apparatus comprises an elastic column comprising:
   a first end fastened to the power supply part; and
   a second end fastened to the lens bearing apparatus,
   wherein the elastic column is configured to elastically bend when pulled by the lens bearing apparatus.

\* \* \* \* \*

UNITED STATES PATENT AND TRADEMARK OFFICE
CERTIFICATE OF CORRECTION

| | |
|---|---|
| PATENT NO. | : 12,143,700 B2 |
| APPLICATION NO. | : 17/782038 |
| DATED | : November 12, 2024 |
| INVENTOR(S) | : Zhangcheng Li et al. |

Page 1 of 1

It is certified that error appears in the above-identified patent and that said Letters Patent is hereby corrected as shown below:

In the Claims

Claim 10, Column 18, Lines 40-41: "alloy wires is wire is coupled between" should read "alloy wires is coupled between"

Claim 11, Column 18, Lines 59-60: "alloy wires is wire is coupled between" should read "alloy wires is coupled between"

Signed and Sealed this
Seventeenth Day of December, 2024

Derrick Brent
*Acting Director of the United States Patent and Trademark Office*